Patented Nov. 30, 1943

2,335,429

UNITED STATES PATENT OFFICE 2,335,429

ACCELERATOR OF VULCANIZATION

William E. Messer, Cheshire, Conn., assignor to United States Rubber Company, New York, N. Y., a corporation of New Jersey No Drawing. Application April 30, 1942, Serial No. 441,210

9 Claims. (Cl. 260—785)

This invention relates to a new class of compounds which have been found valuable as accelerators for the vulcanization of rubber.

This case is a continuation-in-part of my copending applications Serial No. 280,929, filed June 24, 1939, and Serial No. 334,343, filed May 10, 1940.

The new class of rubber vulcanization accelerators may be represented by the general formula R—O—X where R is an arylene-thiazyl sulfide group; O is oxygen; and X represents an alkyl, aryl or R group.

These materials are derivatives of arylene-thiazyl sulfur chloride, wherein the chlorine is replaced by the O—X group above, when the arylene-thiazyl sulfur chloride is reacted with water, alcohols, or phenols. During such reaction, hydrogen chloride is eliminated.

In the following illustrative examples, benzothiazyl sulfur chloride is used as the reagent; it may be prepared in solution, for purposes of reaction, by passing dry chlorine into a slurry of 1,1' dithio bis-benzothiazole in benzene, carbon tetrachloride, etc.

The accelerators are delayed-action accelerators similar in this respect to 1,1' dithio bisbenzothiazole itself. Hence they may be used alone or in conjunction with more basic nitrogen compounds such as ammonia, amines, guanidines such as diphenyl guanidine, thiuram sulfides such as tetramethyl thiuram monosulfide, etc., which function as activators. They may also, if desired, be used in admixture with other thiazole accelerators such as the mercapto-benzothiazyl sulfides.

The following examples are given to illustrate the invention in which comparison is made with a stock containing 1,1' dithio bis-benzothiazole (parts are by weight):

EXAMPLE

To a mixture of 20 grams 1,1'-dithio bis benzothiazole and 100 ccs. carbon tetrachloride, the theoretical amount of chlorine was introduced and the resulting product was added slowly to 400 ccs. water with strong agitation. After all the carbon tetrachloride solution had been added, the mixture was stirred and heated two hours during which time the carbon tetrachloride was distilled off and recovered. The reaction mixture was cooled, filtered, washed and dried. A yield of 15 grams of a nearly white product was obtained. It had a melting range of 161–169° C. and analyzed 8.14% nitrogen (theory is 8.05% nitrogen).

The structure is believed to be:

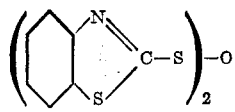

The following rubber stocks were made, vulcanized and tested:

|  | Stock | |
| --- | --- | --- |
|  | A | B |
| Pale crepe | 100 | 100 |
| Zinc oxide | 10 | 10 |
| Lithopone | 40 | 40 |
| Whiting | 50 | 50 |
| Reinforcing clay | 25 | 25 |
| Zinc soap of cocoanut oil acid | 1 | 1 |
| Sulfur | 3 | 3 |
| 1,1' dithio bis-benzothiazole | 0.65 | |
| Accelerator of the example above | | 0.65 |

Tensiles—unaged

| Minutes cure at 30 lbs. per sq. inch steam pressure | A | | B | |
| --- | --- | --- | --- | --- |
|  | T | E | T | E |
| 10 | 120 | 1,080 | 40 | 1,210 |
| 20 | 820 | 503 | 900 | 470 |
| 30 | 1,970 | 576 | 1,850 | 583 |
| 40 | 2,200 | 590 | 2,200 | 580 |
| 50 | 2,240 | 573 | 2,350 | 566 |

T=ultimate tensils in pounds per square inch.
E=Percent elongation at break.

Tensiles—aged 6 days in oxygen

| Minutes cure at 30 lbs. per sq. inch steam pressure | A | | B | |
| --- | --- | --- | --- | --- |
|  | T | E | T | E |
| 10 | 170 | 610 | 170 | 570 |
| 20 | 770 | 430 | 770 | 446 |
| 30 | 1,760 | 510 | 1,800 | 520 |
| 40 | 1,830 | 530 | 1,970 | 536 |
| 50 | 1,740 | 523 | 1,830 | 523 |

T=ultimate tensils in pounds per square inch.
E=Percent elongation at break.

Scorch test

| Minutes cure at 5 lbs. per sq. inch steam pressure | A | | B | |
| --- | --- | --- | --- | --- |
|  | T | E | T | E |
| 90 | 0 | 1,306 | 0 | 1,320 |
| 105 | 0 | 1,170 | 0 | 1,196 |
| 120 | 0 | 1,103 | 0 | 1,230 |
| 150 | 260 | 642 | 165 | 732 |

T=ultimate tensils in pounds per square inch.
E=Percent elongation at break.

When an alcohol (or alcoholate), or phenol (or phenolate) is reacted with the arylene-thiazyl sulfur chloride, compounds of the type of benzothiazyl ethoxy sulfide, and benzothiazyl phenoxy sulfide are produced, the O-alkyl or O-aryl group being joined to the thiol sulfur atom.

Instead of ethyl alcohol, other aliphatic alcohols may be used for purposes of the invention including n-propyl alcohol, isopropyl alcohol, tertiary butyl alcohol, cyclohexanol, ethylene glycol, and benzyl alcohol.

Examples of other benzothiazyl alkoxy sulfides are benzothiazyl n-propoxy sulfide, benzothiazyl isopropoxy sulfide, benzothiazyl t-butoxy sulfide, benzothiazyl cyclohexyloxy sulfide, benzothiazyl ethylene dioxy sulfide, and benzothiazyl benzyloxy sulfide.

Instead of phenol, other aromatic hydroxy bodies such as alpha and beta naphthols, xenol, cresols, carvacrol and thymol may be used.

Examples of other benzothiazyl aryloxy sulfides are benzothiazyl alpha naphthoxy sulfide, benzothiazyl p-phenyl phenoxy sulfide, benzothiazyl o-methyl phenoxy sulfide, benzothiazyl carvacryloxy sulfide, and benzothiazyl thymoloxy sulfide.

It is to be understood that the term "a rubber" is employed in the appended claims in a generic sense to designate rubbery materials capable of vulcanization when heated with sulfur and includes caoutchouc, balata, gutta percha, latex, rubber isomers, or synthetic rubber, whether or not admixed with pigments, fillers, softeners, antioxidants, other accelerators, etc.

Having thus described my invention, what I claim and desire to protect by Letters Patent is:

1. A method which comprises vulcanizing rubber in the presence of a compound having the general formula R—O—X where R is an arylene-thiazyl sulfide group; O is oxygen; and X represents a member selected from the class consisting of an alkyl, an aryl, and an arylene-thiazyl sulfide group.

2. A method which comprises vulcanizing rubber in the presence of a compound having the general formula R—O-alkyl where R is an arylene-thiazyl sulfide group; and O is oxygen.

3. A method which comprises vulcanizing rubber in the presence of a compound having the general formula R—O-aryl where R is an arylene-thiazyl sulfide group; and O is oxygen.

4. The vulcanization product of a rubber composition containing a compound having the formula R—O—X where R is an arylene-thiazyl sulfide group; O is oxygen; and X represents a member selected from the class consisting of an alkyl, an aryl, and an arylene-thiazyl sulfide group.

5. The vulcanization product of a rubber composition containing a compound having the formula R—O-alkyl where R is an arylene-thiazyl sulfide group; and O is oxygen.

6. The vulcanization product of a rubber composition containing a compound having the formula R—O-aryl where R is an arylene-thiazyl sulfide group; and O is oxygen.

7. A method which comprises vulcanizing a rubber in the presence of a benzothiazyl aryloxy sulfide.

8. A method which comprises vulcanizing a rubber in the presence of a benzothiazyl alkoxy sulfide.

9. A method which comprises vulcanizing a rubber in the presence of a compound having the formula

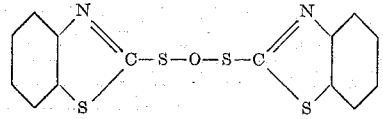

WILLIAM E. MESSER.